US006434228B1

(12) United States Patent
Antrim et al.

(10) Patent No.: US 6,434,228 B1
(45) Date of Patent: Aug. 13, 2002

(54) METHOD AND APPARATUS FOR ROUTING CALLS WITH A DIGITAL CROSS-CONNECT SYSTEM

(75) Inventors: Todd W. Antrim, Newnan; Curtis M. Abrue, Cumming, both of GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/334,263

(22) Filed: Jun. 16, 1999

(51) Int. Cl.[7] .............................................. H04M 3/42
(52) U.S. Cl. .................................. 379/207.03; 379/229
(58) Field of Search .................................. 379/229, 230, 379/221.09, 207.02, 207.03, 207.15

(56) References Cited

U.S. PATENT DOCUMENTS

| | | | | |
|---|---|---|---|---|
| 5,530,744 A | * | 6/1996 | Charalambous et al. | 379/112 |
| 5,550,834 A | * | 8/1996 | D'Ambrogio et al. | 370/385 |
| 5,630,204 A | * | 5/1997 | Hyltone et al. | 370/342 X |
| 5,787,085 A | * | 7/1998 | Fox | 370/411 X |
| 5,956,165 A | * | 9/1999 | Fee et al. | |
| 6,078,659 A | * | 6/2000 | De Trana et al. | 379/220 X |

* cited by examiner

Primary Examiner—Creighton Smith
(74) Attorney, Agent, or Firm—Shaw Pittman LLP

(57) ABSTRACT

A method and apparatus for routing calls that receives a call, identifies the subscriber, determines the preferred call carrier, and routes the call to a line connected to the preferred call carrier, all before the call enters the region between local access transport areas. The invention comprises a digital cross-connect system, a computer with a database connected to the digital cross-connect system, and a service management system connected to the computer. The service management system programs the computer with routing information that corresponds to the subscriber's calling plan. The digital cross-connect system receives calls and sends them to the computer. The computer identifies the call information and uses a routing table to determine the correct call carrier for the call. The computer sends the call with routing information back to the digital cross-connect system where the call is routed to the appropriate local or interexchange carrier, e.g., a local network or long distance carrier.

16 Claims, 4 Drawing Sheets

METHOD AND APPARATUS FOR ROUTING CALLS WITH A DIGITAL CROSS-CONNECT SYSTEM

BACKGROUND

1. Field of the Invention

The present invention relates to the field of switched telephony, and in particular, to digital cross-connect systems and methods by which calls are routed through digital cross-connect systems.

2. Background of the Invention

Conventional telephone network systems route calls from subscriber equipment (sometimes referred to as customer premise equipment or "CPE") to a local network or long distance carrier using hard-wired connections in a digital cross-connect system. Typically, the digital cross-connect system ("DCS") receives DS-3 lines and connects them to fixed outgoing lines to call carriers. The DS-3 lines typically contain twenty-eight T-1 lines, which in turn each typically contain twenty-four DSO lines. Thus, the typical DCS receives a total of 672 DSO lines (24 ×28) and routes them to 672 outgoing lines. The DCS has no switching capabilities and merely routes incoming calls based on the hard-wired connections to outgoing lines. This routing is determined at the time of installation and cannot be remotely altered or programmed.

Because the DCS lacks routing capabilities, all calls received from a particular DSO line are routed to the same outgoing line. The outgoing line is connected to a specific call carrier, e.g., local or long distance, that handles the routing of the call from that point forward. The DCS routes an individual call to the specified carrier regardless of whether the service is optimal for that call. Thus, for example, if a DSO line is hard-wired to a local network, an incoming long distance call must first go to the local network and then be switched to a long distance carrier. Thus, because all calls are routed the same way, a telephone service subscriber can not specify a particular carrier for a particular type of call.

Subscribers to a single DSO line are faced with two call routing options: (1) send all calls from a particular DSO line to a local network or (2) send all calls from a particular DSO line to a long distance carrier. Each option presents considerable drawbacks.

The first option sends all calls to the local network and has the local network switch long distance calls to a long distance carrier. Because the switching is completed within the local access transport area (the "LATA"), this method is considered "switching traffic", and is subject to switch origination and termination hi fees imposed by federal regulation. Thus, by not directly accessing a long distance carrier, the subscriber may pay unnecessary fees for using long distance service.

The second option sends all calls to the long distance carrier for switching. In this case, the long distance carrier must switch local calls to local networks and therefore burden the subscriber with extra switching charges.

For subscribers of multiple DSO lines, the additional lines offer only a moderate increase in call routing flexibility. Multiple line subscribers have the following options: (1) dedicate certain DSO lines to local networks and other DSO lines to long distance carriers or (2) use subscriber equipment to internally route calls to specific DSO lines connected to local or long distance lines. However, once again, each option presents disadvantages.

The first option connects certain incoming DSO lines to local carriers and other DSO lines to long distance carriers. These designated connections require the subscriber to predict how many local and long distance calls will be made at any one time. Once connections are made based on this prediction, the subscriber must monitor its callers to ensure that the callers are using the appropriate lines for particular calls (i.e., local calls on lines connected to local networks and long to distance calls on lines connected to long distance carriers). Further, if the subscriber's calling patterns change, such that the demand for local or long distance calls exceed the available lines, the subscriber must go through the costly and time consuming exercise of changing or adding to the hard-wired DCS connections. In the end, because of problems with caller error or capacity problems, calls are often routed to an inappropriate service, which must then switch the call and incur additional fees.

The second option is also not a complete solution. To better coordinate the access of outside lines and to avoid unnecessary switching charges, subscribers sometimes use Private Branch Exchange ("PBX") equipment to internally switch and connect calls to the appropriate local or long distance network lines. The PBX equipment evaluates the type of call being made from the subscriber premises and chooses the DSO line connected to the service appropriate for the call type. Although this technique reduces unnecessary switching charges, the purchase, installation, and operation of PBX equipment itself is quite expensive.

Additionally, the PBX equipment does not completely solve the line capacity problem. If, for example, all of the subscriber's long distance lines are in use, the PBX will route a long distance call to a local network line. As a result, the subscriber pays for the local network to switch the call to another long distance carrier and loses the discounts the subscriber would have received by using the dedicated long distance lines.

In response to the drawbacks of the above four options, one solution could be to have the local exchange company provide long distance service through its switch, e.g., central office. However, federal regulations prohibit certain local exchange carriers from switching calls in this manner.

Thus, there remains a need for a routing system that classifies and routes calls before they reach an inter-LATA central office and are subject to switch origination and termination fees. The routing system should recognize the subscriber from whom a call is coming, should determine the appropriate carrier for the call, and should route that call to the line of the appropriate call carrier. The routing system should be able to accommodate varying demands for particular local or long distance services without exceeding the capacity of the outgoing lines. Further, to comply with federal regulations, the routing system must not use the switch or central office of a local exchange company to provide the service.

SUMMARY OF THE INVENTION

The present invention is a call routing system that enables local exchange carriers to route calls to specific carriers before the calls enter the inter-LATA region and become subject to unnecessary switching-fees. The call routing system receives a call, identifies the subscriber and the type of call, determines the preferred call carrier, and routes the call to a line connected to the preferred call carrier, all before the call enters the inter-LATA region. The present invention affords subscribers the flexibility both to connect with the carrier most appropriate for the type of call being placed and also to access as many carrier lines as required to handle increased call traffic.

A preferred embodiment of the present invention is shown schematically in FIG. 1. The preferred embodiment comprises a DCS, a computer with a database (hereinafter referred to as "computer"), and a service management system. For connections, the DCS has an incoming and outgoing terminal, the computer has a data input, a data output, and a programming input, and the service management system has a programming output. The incoming terminal of the DCS is connected to the subscriber equipment on one side and the data input of the computer on another side. The data output of the computer is connected to the outgoing terminal of the DCS. The outgoing terminal of the DCS is connected to the outgoing lines to the local and long distance networks. The programming output of the service management system is connected directly to the programming input of the computer.

As shown in FIGS. 2–3, the call flow is as follows. A call originating from the subscriber equipment travels through a DSO line and enters the DCS at the incoming terminal. The incoming terminal sends to the computer the call and trigger information corresponding to the call. The computer processes the call using the trigger information and sends the call with corresponding routing instructions to the outgoing terminal of the DCS. The DCS routes the call to the outgoing line designated by the computer. The call travels through the outgoing line to the local or long distance network preferred by the subscriber. The service management system is not involved in the call routing and is only used to set up or modify the subscriber preferences that govern the computer processing.

Managing calls through the computer allows a local exchange company to provide routing functions before calls enter the inter-LATA region and incur the federally imposed switching origination and termination fees. As an advantage to both the local exchange carriers and the subscribers, the present invention allows the local exchange carriers to provide local and long distance service together in a cost-effective package. In addition, by using a DCS and computer instead of switches, this routing method complies with federal prohibitions against providing long distance services through local exchange company switches.

The present invention also enables telephone subscribers to create custom-calling plans that route particular calls to designated local networks or long distance carriers. The invention recognizes the subscriber originating a call and assigns the call to the outgoing line specified by the subscriber's calling plan. Using a routing table, the outgoing line chosen by the computer is customized to suit the subscriber's call preferences based on variables such as the calling number, the exchange number, the time of day, the day of the week, or any number of other factors.

The present invention also eliminates the capacity problem subscribers currently face. Because the outgoing DCS terminations are not dedicated to a particular subscriber or incoming DSO line, the present invention can accommodate varying subscriber usage and always have lines available for local and long distance service.

In a preferred embodiment of the present invention, the DCS provides dial tone emulation to the subscriber equipment. This dial tone emulation substitutes for the dial tone that is typically furnished in a conventional routing system by the local or long distance network connected to the subscriber equipment through the DCS. For the present invention, when the DCS is altered to route calls through the computer, the dial tone is sent by the DCS instead of the local network or long distance carrier.

As shown in FIG. 3, in providing a dial tone, the computer monitors the line from the subscriber equipment to the DCS for an off-hook trigger. When the trigger is received, the computer sends a dial tone to the subscriber until a button is pushed on the telephone. The dial tone emulation operates to provide the caller with the dial tone the caller is expecting to hear, but does not affect the routing functions of the present invention.

Accordingly, an object of the present invention is to provide a call routing system that substitutes for routing long distance service through a switch, e.g., a central office.

It is another object of the present invention to provide a system that routes calls to appropriate carriers before the calls enter the inter-LATA region and become subject to switching origination and termination fees.

These and other objects of the present invention are described in greater detail in the detailed description of the invention, the appended drawings and the attached claims.

DETAILED DESCRIPTION OF THE INVENTION

Figure 1:
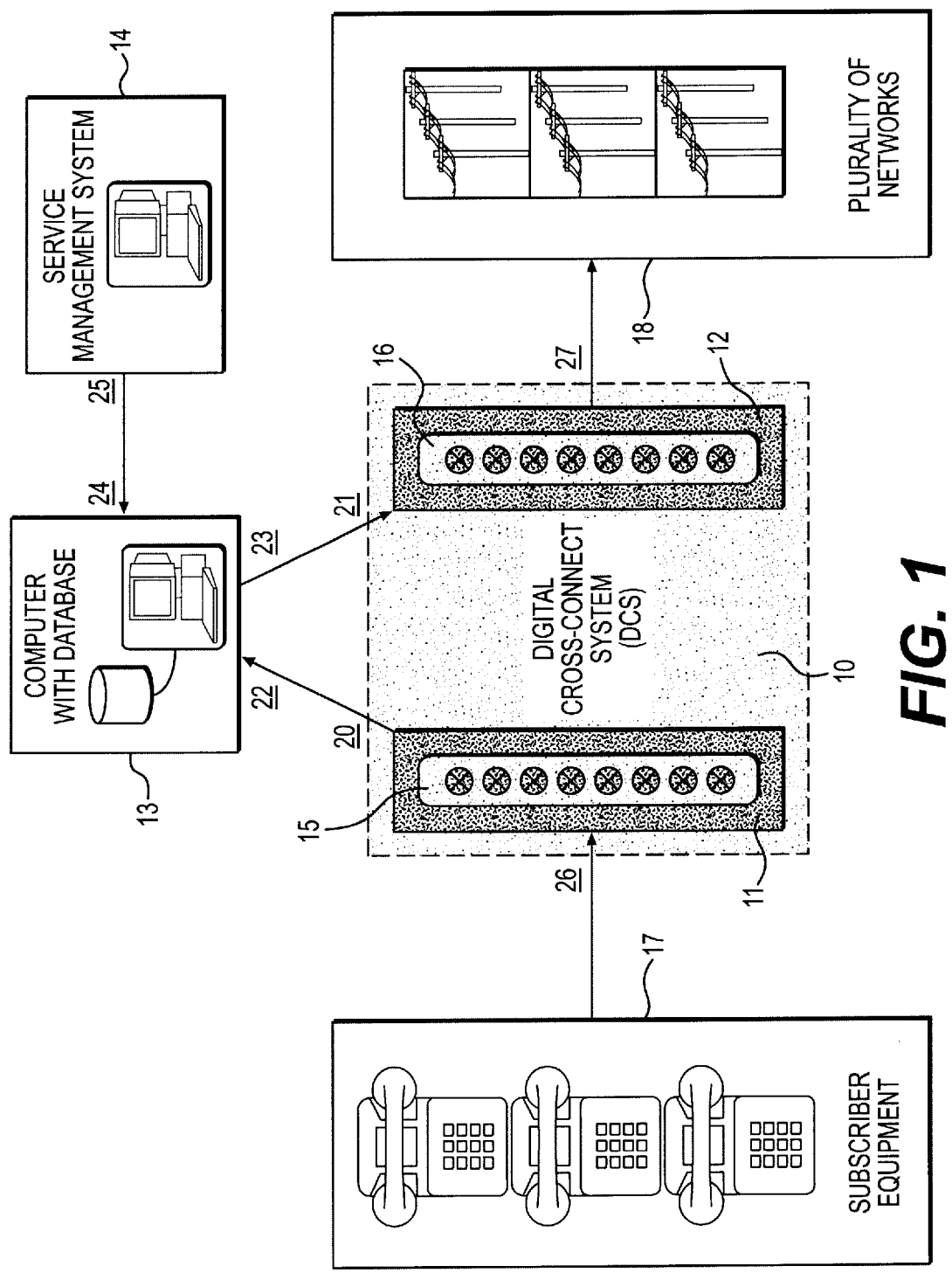
FIG. 1 is a schematic diagram of a call routing system using a DCS and computer.

As shown in FIG. 1, the call routing system comprises a DCS 10, a computer 13, and a service management system 14. DCS 10 comprises incoming terminal 11 and outgoing terminal 12. Both incoming terminal 11 and outgoing terminal 12 have a plurality of terminal connections 15 and 16, respectively. Incoming terminal output 20 is connected to trigger input 22 at computer 13. Computer trigger output 23 is connected to input 21 at outgoing terminal 12. Computer programming input 24 is connected to service management system programming output 25. External to the call routing system, subscriber equipment 17 is connected to incoming terminal input 26 and a plurality of networks 18 is connected to outgoing terminal output 27.

FIG. 1 shows the elements and connections used to implement a preferred embodiment of the present invention. The present invention routes calls as follows. A call originating from subscriber equipment 17 enters incoming terminal input 26 at one of the plurality of incoming terminal connections 15. The call travels from one of the plurality of incoming terminal connections 15, through incoming terminal output 20, and into trigger input 22 of computer 13. Computer 13 recognizes the call trigger information, identifies the subscriber from whom the call originated, and looks up the call carrier corresponding to the subscriber's calling plan. Computer 13 then sends the call with the routing information out of the computer trigger output 23 and into input 21 at outgoing terminal 12. Using the packet information from computer 13, DCS 10 routes the call to one of the plurality of outgoing terminal connections 16 corresponding to the subscriber's preferred call carrier. Once the appropriate line is chosen, the call exits outgoing terminal 12 through outgoing terminal output 27 and travels to one of the plurality of networks 18.

To facilitate routing, computer 13 receives, validates, and processes signal information. Using triggers, e.g., exchange numbers, computer 13 identifies the subscriber, determines the type of call that is being made, e.g., local or long distance, looks up the type of call on the subscriber's call routing table, and determines the call carrier, e.g., local or long distance carrier, corresponding to the subscriber's calling plan. Each subscriber has a custom routing table that specifies the call carrier for each type of call. The custom routing table matches the terms of the subscriber's calling plan and dictates the computer response based on any number of factors, e.g., the calling number, the exchange number, the time of day, and the day of the week.

The routing table is entered in the database of computer 13 with service management system 14, through the connection between service management system programming output 25 and computer programming input 24. Service management system 14 is also referred to as a dataport. Once installed, the routing table remains intact unless the subscriber desires a change to the calling plan. To change the calling plan, the new routing table information is entered with service management system 14.

Figure 2:
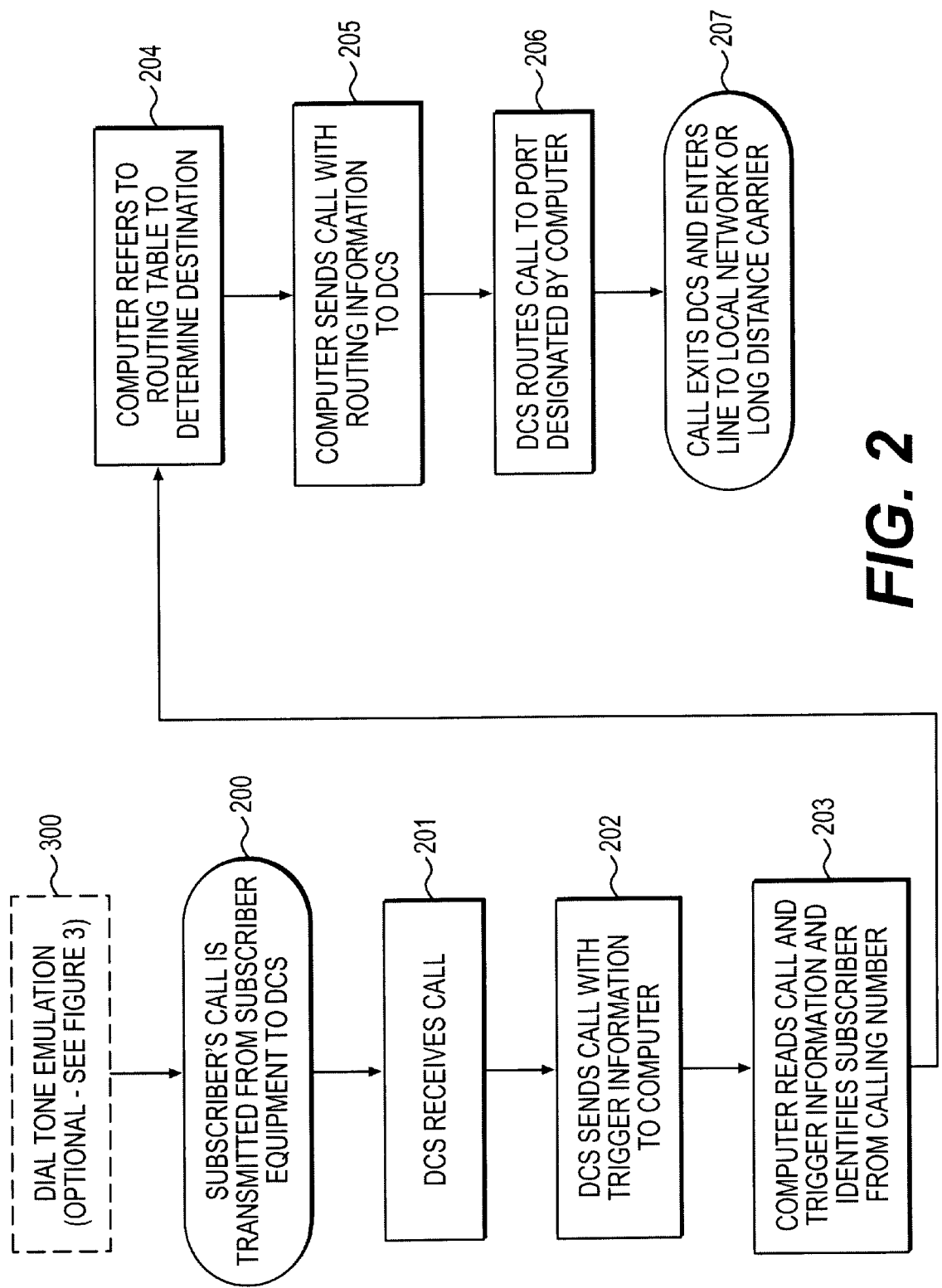
FIG. 2 is a flow chart that illustrates the call processing of the present invention.
Figure 3:
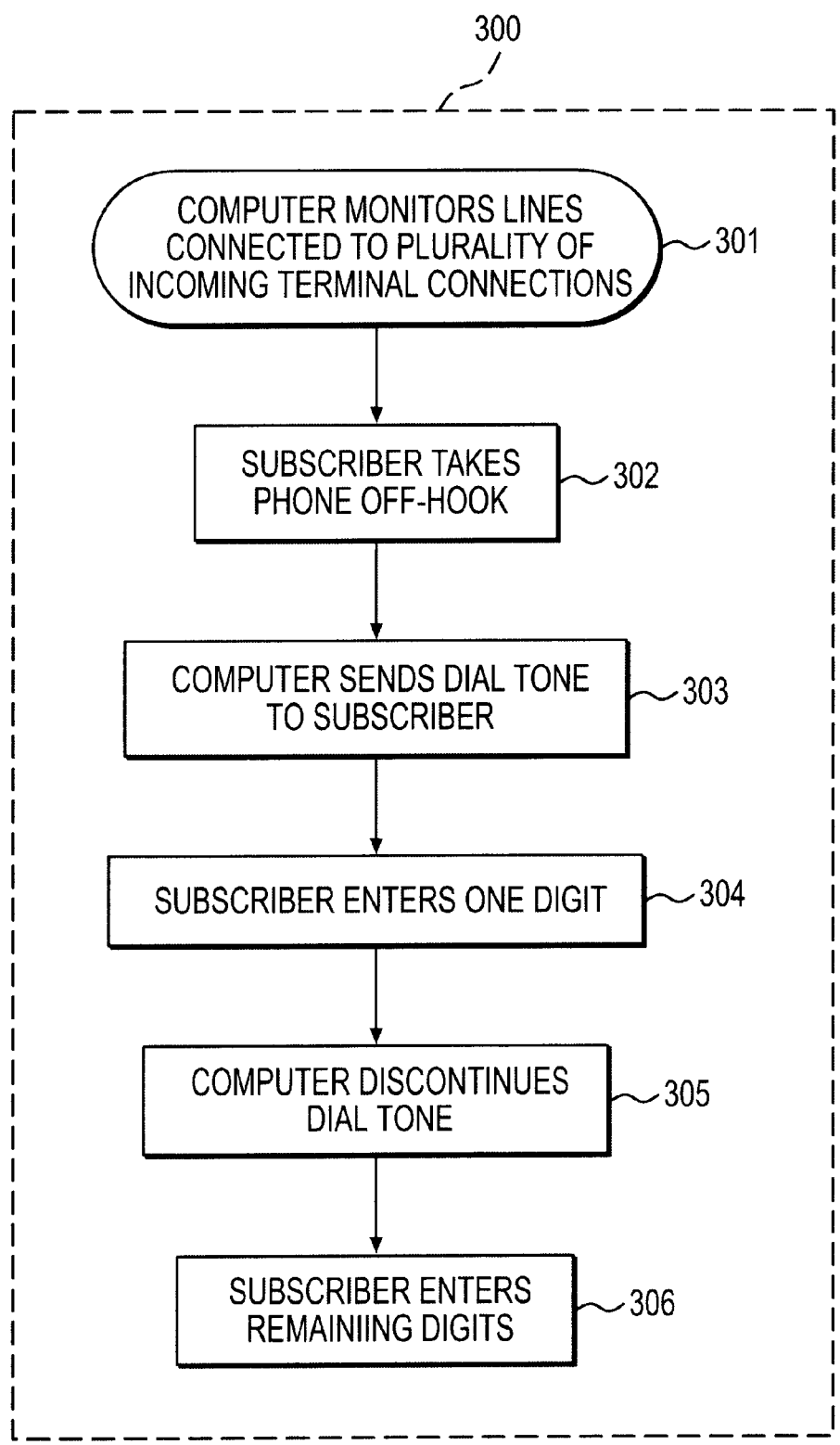
FIG. 3 is a flow chart that illustrates the dial tone emulation of the present invention.

FIG. 2 is a flow chart that illustrates the method of the present invention and the specific way in which the elements of FIG. 1 cooperate. Optionally, dial tone emulation is provided in step 300, the details of which are shown in FIG. 3 and described below. In step 200, the subscriber's completed call is transmitted from subscriber equipment 17 to DCS 10.

DCS 10 receives the call in step 201 at any one of plurality of incoming terminal connections 15. In addition to the call, DCS 10 also receives trigger information that is capable of initiating queries to a computer and database. The trigger information consists of call information, such as called party number and calling party number.

In step 202, DCS 10 routes the call with the trigger information to the computer 13. Although DCS 10 contains a plurality of incoming terminal connections 15 with which to receive calls from various subscribers, all incoming calls are routed to the computer 13 for processing and routing.

In step 203, computer 13 reads the call and trigger information and uses the calling number to identify the subscriber placing the call. Computer 13 can receive call information, cross-reference the call information with corresponding routing information, and then generate a routing instruction from the routing information.

In step 204, computer 13 consults a routing table to cross-reference the calling information with subscriber calling plan information. The routing table is a database based on instructions submitted by the subscriber. Each subscriber has a list of the possible variables associated with a call, such as the time of day, the day of the week, or the exchange number of the called number. A call carrier preferred by the subscriber and dictated by the calling plan is assigned to every combination of variables. Thus, computer 13 reads the call information, goes to the subscriber's routing table, assigns a value to each relevant variable listed in the routing table, identifies the particular combination of assigned variables for the call, and determines the call carrier matching the combination of variables. The end result of the process is the identification of a call carrier to whom the call is routed.

Figure 2A:
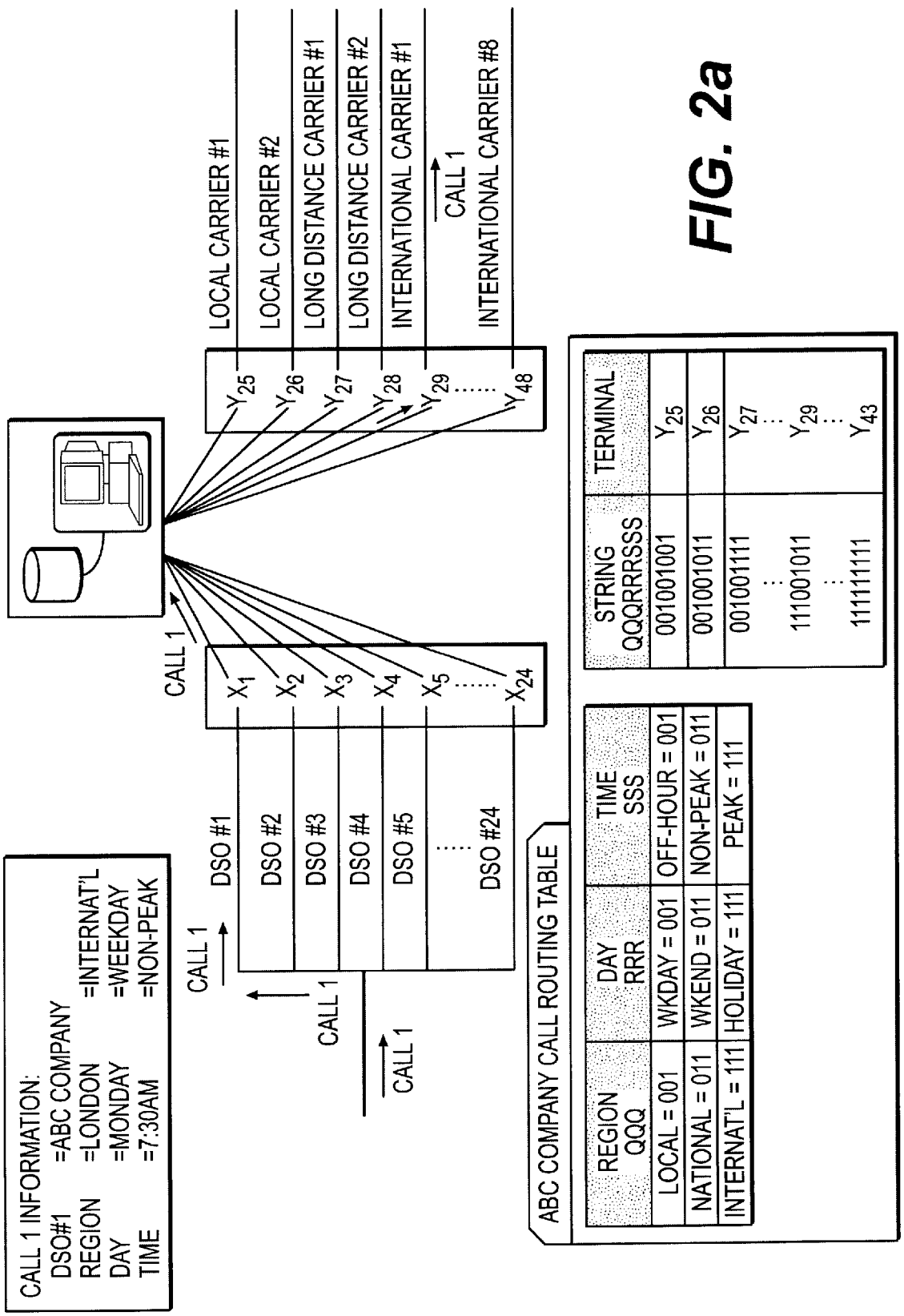
FIG. 2a is a schematic diagram of the call routing and decision-making performed by the computer for an example call.

The following example, shown schematically in FIG. 2a, illustrates the computer processing function of step 204. ABC Company in Atlanta places call 1 to a London phone number on a Monday at 7:30AM. The computer receives call 1 and determines from the calling number that ABC is the subscriber. The computer also recognizes from the called number that the call is an international call. Finally, the computer recognizes the time and day of the call.

The computer consults the routing table (or accesses an Advanced Intelligent Network platform) assigned to ABC to find ABC's calling plan. The table at the bottom of FIG. 2a is an example routing table entitled "ABC Company Call Routing Table." Cross-referencing the calling information on the call routing table, the computer assigns values to each variable of that calling plan: for example, 111 for an international region, 001 for a weekday call, and 011 for a non-peak time. After assigning these values, the computer concatenates the values in a string, 111001011, and looks for that string combination on the routing table. For that string, the routing table dictates that the call carrier is international carrier #1 connected to terminal $Y_{29}$ of the plurality of outgoing terminal connections on the DCS.

Once computer 13 has determined the call carrier, computer 13 writes a routing instruction and sends the call and routing instruction to DCS 10, as shown in step 205. As described in step 206, the DCS routes the call to the specific outgoing terminal connection, or port, corresponding to the call carrier dictated by the routing table. Finally, in step 207, the call exits DCS 10 and travels to the local network or long distance carrier corresponding to the outgoing terminal connection.

In the preferred embodiment of the present invention, dial tone emulation is furnished when the subscriber equipment is off-hook to substitute for the dial tone typically provided by the local or long distance carriers. Computer 13 monitors the lines from subscriber, equipment 17 to DCS 10 for an off-hook trigger. When the trigger is received, computer 13 sends a dial tone to the subscriber until the subscriber starts to enter a telephone number on the subscriber equipment. As shown by step 300 in FIG. 2, this dial tone emulation process is optional and occurs before the call enters the call routing system.

FIG. 3 is a flow chart that illustrates the method for producing dial tone emulation in the preferred embodiment of the present invention. Computer 13 continuously monitors the incoming lines connected to the plurality of incoming terminal connections 15, as described in step 301. Computer 13 is configured to respond to an off-hook trigger by sending a dial tone.

In step 302, the subscriber takes his or her phone off-hook and thereby sends a trigger to computer 13. Responding to this trigger, computer 13 sends a continuous dial tone to the subscriber line, as described in step 303. The computer 13 then waits for another trigger associated with the particular subscriber line. In step 304, the subscriber enters one digit of the called number, thereby sending another trigger to computer 13. Computer 13 responds to this trigger in step 305 by discontinuing the dial tone. The subscriber then completes the dialing of the remaining digits of the called number in step 306. The calling process then proceeds through the call routing system as described starting with step 201 in FIG. 2.

By routing calls before the calls enter the local or long distance network, the present invention affords subscribers several benefits. Namely, the invention provides flexible, unlimited access to local and long distance service that can accommodate fluctuating call traffic without burdening the subscriber with additional equipment costs or unnecessary switching fees.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A call routing system comprising:
    (a) a computer having a call input, a call output, a programming input, and a database containing a routing table;
    (b) a plurality of incoming terminals connected to the call input of the computer;
    (c) a plurality of outgoing terminals connected to the call output of the computer;
    (d) a service management system connected to the programming input of the computer, providing means to enter and to modify the routing table; and
    (e) a routing application provisioned on the computer that looks up call information in the routing table of the database, determines an appropriate call carrier, and routes the call to the appropriate call carrier before the call exits a local access transport area.

2. The call routing system of claim 1, further comprising:
    (f) a plurality of subscriber equipment connected to the plurality of incoming terminals; and
    (g) a plurality of networks connected to the plurality of outgoing terminals.

3. The call routing system of claim 1, further comprising a digital cross-connect system that houses the plurality of incoming terminals and the plurality of outgoing terminals.

4. The call routing system of claim 1, wherein the call information in the routing table comprises:
    (i) a list of subscribers;
    (ii) a list of call types corresponding to each subscriber of the list of subscribers; and
    (iii) a list of call carriers corresponding to each call type of the list of call types.

5. The call routing system of claim 4, wherein the list of call types comprises:
    (i) a list of call variables;
    (ii) a list of string variables corresponding to each combination of call variables; and
    (iii) a list of call types corresponding to each string variable of the list of string variables.

6. A call routing system comprising:
    (a) a digital cross-connect system, having a first input, a first output, a second input, and a second output;
    (b) a computer, having a first input connected to the first output of the digital cross-connect system, having an output connected to the second input of the digital cross-connect system, having a second input, and having a database;
    (c) a plurality of subscriber equipment connected to the first input of the digital cross-connect system;
    (d) a plurality of networks connected to the second output of the digital cross-connect system; and
    (e) a service management system connected to the second input of the computer providing means to enter and to modify information in the database,
    wherein the digital cross-connect system and the computer receive and route a call before the call exits the local access transport area.

7. A method of routing calls comprising the steps of:
    (a) receiving a call at a digital cross-connect system located within a local access transport area;
    (b) sending the call from the digital cross-connect system to a computer within the local access transport area;
    (c) generating a routing instruction for the call, the routing instruction specifying an outgoing terminal of the DCS that connects to a call carrier appropriate for the call;
    (d) sending the call and the routing instruction from the computer to the digital cross-connect system; and
    (e) routing the call in accordance with the routing instruction from the digital cross-connect system to the outgoing terminal of the digital cross-connect system before the call exits the local access transport area.

8. The method of routing calls of claim 7, wherein the step of generating a routing instruction comprises the substeps of:
    (i) identifying a subscriber making the call;
    (ii) classifying the call as a type of call;
    (iii) looking up the subscriber in a database of the computer;
    (iv) cross-referencing the subscriber and the type of call with a call carrier; and
    (v) identifying a routing instruction corresponding to the call carrier.

9. The method of routing calls of claim 7, further comprising prior to step (a) the steps of:
    (x) monitoring with the computer a plurality of lines entering the digital cross-connect system for an off-hook trigger;
    (y) transmitting a dial tone signal to each line of the plurality of lines from which the off-hook trigger is received by the computer; and
    (z) discontinuing the dial tone signal when a pulse or tone signal is received by the computer.

10. The method of routing calls of claim 7, wherein the computer comprises a routing table and the step of generating a routing instruction comprises the substeps of:
    (i) reading call information related to the call;
    (ii) finding the call information in the routing table;
    (iii) determining from the routing table a call carrier corresponding to the call information, said call carrier being the call carrier appropriate for the call; and
    (iv) determining from the routing table the outgoing terminal corresponding to the call carrier appropriate for the call.

11. The method of routing calls of claim 10, wherein the call information comprises a caller number, a subscriber number, a time of the call, and a called number.

12. A method of constructing a digital cross-connect system comprising the steps of:
    (a) removing any connections between an incoming terminal and an outgoing terminal of the digital cross-connect system;
    (b) installing a computer in the digital cross-connect system;
    (c) connecting the incoming terminal to an input of the computer; and
    (d) connecting the outgoing terminal to an output of the computer,
    wherein a call is transmitted from the incoming terminal to the computer and from the computer to the outgoing terminal before the call exits a local access transport area region.

13. A method of routing calls placed -from subscriber premise equipment comprising the steps of:
  (a) transmitting a call to a digital cross-connect system;
  (b) routing the call from the digital cross-connect system to a computer;
  (c) screening the call with the computer to identify call information;
  (d) cross-referencing the call information in a routing table to determine a call carrier;
  (e) choosing an outgoing line corresponding to the call carrier;
  (f) compiling a routing instruction corresponding to the outgoing line;
  (g) sending the call and the routing instruction from the computer to the digital cross-connect system; and
  (h) transmitting the call from the digital cross-connect system to the outgoing line before the call exits the local access transport area.

14. The method of routing calls of claim 13, wherein the call information comprises a caller number, a subscriber number, a time of the call, and a called number.

15. A call routing system comprising:
  (a) means for receiving an incoming call;
  (b) means for identifying call information associated with the incoming call;
  (c) means for determining a call carrier appropriate for the call information; and
  (d) means for routing the call to a line connected to the call carrier before the call exits a local access transport area.

16. The call routing system of claim 15, wherein the call information comprises a caller number, a subscriber name, a time of the call, and a called number.

\* \* \* \* \*